United States Patent
Seo et al.

(10) Patent No.: US 12,425,919 B2
(45) Date of Patent: Sep. 23, 2025

(54) TRAFFIC OPTIMIZATION MODULE AND OPERATING METHOD THEREOF

(71) Applicant: SAMSUNG ELECTRONICS CO., LTD., Suwon-si (KR)

(72) Inventors: Jihwan Seo, Suwon-si (KR); Seonjun Park, Suwon-si (KR); Beomseok Oh, Suwon-si (KR); Sewon Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 408 days.

(21) Appl. No.: 17/972,270

(22) Filed: Oct. 24, 2022

(65) Prior Publication Data

US 2023/0171640 A1    Jun. 1, 2023

Related U.S. Application Data

(63) Continuation of application No. PCT/KR2022/013658, filed on Sep. 13, 2022.

(30) Foreign Application Priority Data

Nov. 30, 2021   (KR) .................. 10-2021-0169618
Jan. 17, 2022   (KR) .................. 10-2022-0006662

(51) Int. Cl.
   *H04W 84/18*   (2009.01)
   *H04W 28/06*   (2009.01)
   *H04W 84/12*   (2009.01)

(52) U.S. Cl.
   CPC .................. *H04W 28/06* (2013.01)

(58) Field of Classification Search
   None
   See application file for complete search history.

(56) References Cited

U.S. PATENT DOCUMENTS

| | | |
|---|---|---|
| 8,671,197 B2 | 3/2014 | Gerber et al. |
| 2011/0099332 A1 | 4/2011 | Sofman et al. |

(Continued)

FOREIGN PATENT DOCUMENTS

| | | |
|---|---|---|
| CN | 107196870 A | 9/2017 |
| WO | 2020/242987 A1 | 12/2020 |
| WO | 2021/091523 A1 | 5/2021 |

OTHER PUBLICATIONS

Written Opinion (PCT/ISA/237) issued Dec. 13, 2022 from the International Searching Authority in International Application No. PCT/KR2022/013658.

(Continued)

*Primary Examiner* — Maharishi V Khirodhar
(74) *Attorney, Agent, or Firm* — Sughrue Mion, PLLC

(57) ABSTRACT

A traffic optimization module includes a profile management component and a data restructuring component, wherein the traffic optimization module is configured to receive, from the UPF, context information that is based on a traffic for a data packet being processed; update traffic history information stored in the profile management component based on the context information; determine whether to perform data restructuring that is based on the traffic history information or not by referring to the traffic history information stored in the profile management component; identify a profile that at least matches a target profile requested by the data restructuring component from among the plurality of profiles; restructure a data set included in the identified profile as a data set including data required for processing the context information; and provide the identified profile including the restructured data set to the profile management component.

20 Claims, 10 Drawing Sheets

(56) References Cited

U.S. PATENT DOCUMENTS

| | | |
|---|---|---|
| 2017/0244617 A1* | 8/2017 | Begwani ................. H04L 43/08 |
| 2020/0213886 A1 | 7/2020 | Singhal et al. |
| 2020/0259853 A1 | 8/2020 | Alfano et al. |
| 2021/0219238 A1 | 7/2021 | Sharma et al. |
| 2021/0282038 A1 | 9/2021 | Li et al. |
| 2025/0016527 A1* | 1/2025 | Chen .................... H04W 40/02 |

OTHER PUBLICATIONS

International Search Report (PCT/ISA/210) issued Dec. 13, 2022 from the International Searching Authority in International Application No. PCT/KR2022/013658.

* cited by examiner

TRAFFIC OPTIMIZATION MODULE AND OPERATING METHOD THEREOF

CROSS-REFERENCE TO RELATED APPLICATIONS

This application is a continuation application, claiming priority under § 365(c), of International application No. PCT/KR2022/013658, filed on Sep. 13, 2022, which is based on and claims priority to a Korean Patent Application No. 10-2021-0169618, filed on Nov. 30, 2021, and a Korean Patent Application Number 10-2022-0006662, filed on Jan. 17, 2022, in the Korean Intellectual Property Office, the disclosures of which are incorporated by reference herein in their entireties.

BACKGROUND

1. Technical Field

The disclosure relates to a traffic optimization module and an operation method thereof

2. Description of Related Art

Efforts are being made to develop an improved 5G communication system or a pre-5G communication system to meet increasing demand for wireless data traffic after commercialization of 4G communication system. For this reason, the 5G communication system or the pre-5G communication system is called a communication system after 4G network (Beyond 4G Network) or a system after LTE system (Post LTE). The 5G communication system defined by the 3GPP is called a New Radio (NR) system.

SUMMARY

In a wireless communication system according to an embodiment, a traffic optimization module managing a profile associated with a traffic processing of user plane function (UPF) may comprise a profile management component storing a plurality of profiles; and a data restructuring component for restructuring a cache line included in a profile, wherein the traffic optimization module may be configured to receive, from the UPF via the profile management component, context information that is based on a traffic for a data packet being processed; update, via the profile management component, traffic history information stored in the profile management component based on the context information; determine whether to perform data restructuring that is based on the traffic history information or not by referring to the traffic history information stored in the profile management component via the data restructuring component; identify, via the profile management component, a profile that at least matches a target profile requested by the data restructuring component from among the plurality of profiles, if determining to perform the data restructuring; restructure, via the data restructuring component, a data set included in the identified profile as a data set including data required for processing the context information; and provide, via the data restructuring component to the profile management component, the identified profile including the restructured data set.

In a wireless communication system according to an embodiment, a method for operating a traffic optimization module that manages a plurality of profiles associated with a traffic processing of user plane function (UPF) may comprise receiving, from the UPF, context information that is based on a traffic for a data packet being processed; updating traffic history information stored in a profile management component of the traffic optimization module based on the context information; determining whether to perform data restructuring that is based on the traffic history information or not by referring to the traffic history information; identifying a profile that at least matches a target profile from among the plurality of profiles, if determining to perform the data restructuring; and restructuring a data set included in the identified profile as a data set including data required for processing the context information.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
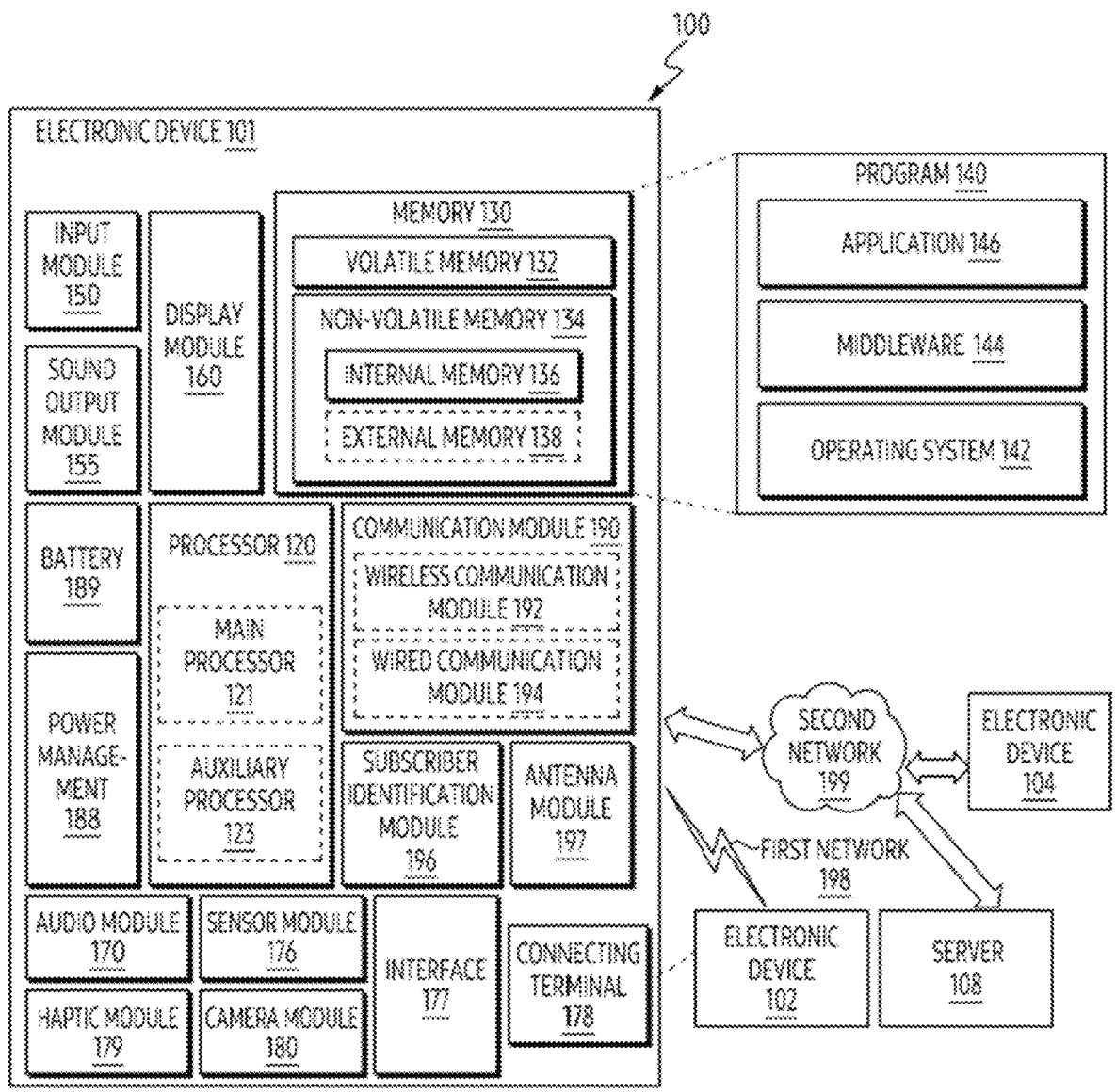
FIG. 1 is a block diagram of an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
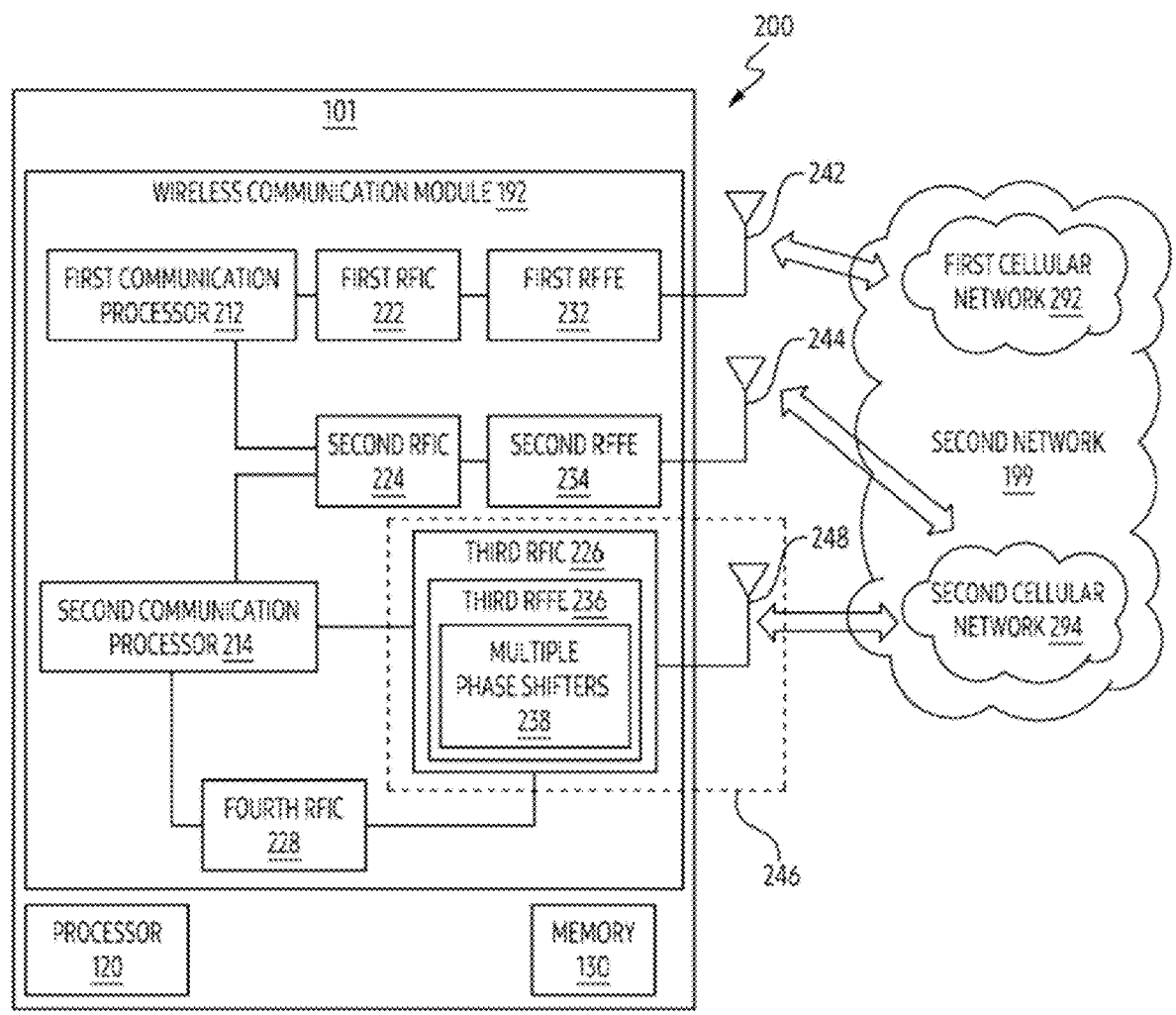
FIG. 2 is a block diagram of an electronic device for supporting legacy network communication and 5G network communication according to various embodiments.

FIG. 2 is a block diagram 200 of the electronic device 101 for supporting legacy network communication and 5G network communication, according to various embodiments.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to various embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment, the first communication processor 212 and the second communication processor 214 may be implemented in a single chip or a single package. According to various embodiments, the first communication processor 212 or the second communication processor 214 may be formed with the processor 120, the coprocessor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212. Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separate from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub-PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

In order to maintain high-speed packet processing performance regardless of a traffic situation, it is required to minimize data access time by loading data used to process packets as much as possible into the cache memory. However, in an existing case, packet processing performance has not been maintained constant for various traffic situations. In order to solve the above problem, load balancing has been proposed. The load balancing may refer to a method of redistributing packets into a spare resource or steering to another module according to a traffic situation.

However, a method that redistributes packets to enough resources or another module for traffic processing, in a situation where the resources of the module processing the packet are not used efficiently, does not overcome the limitation of inefficiently using the resource of the packet processing module itself, and the method has a problem in that costs for securing new resources to process increased traffic or for preparing other modules are rapidly increased.

Figure 3:
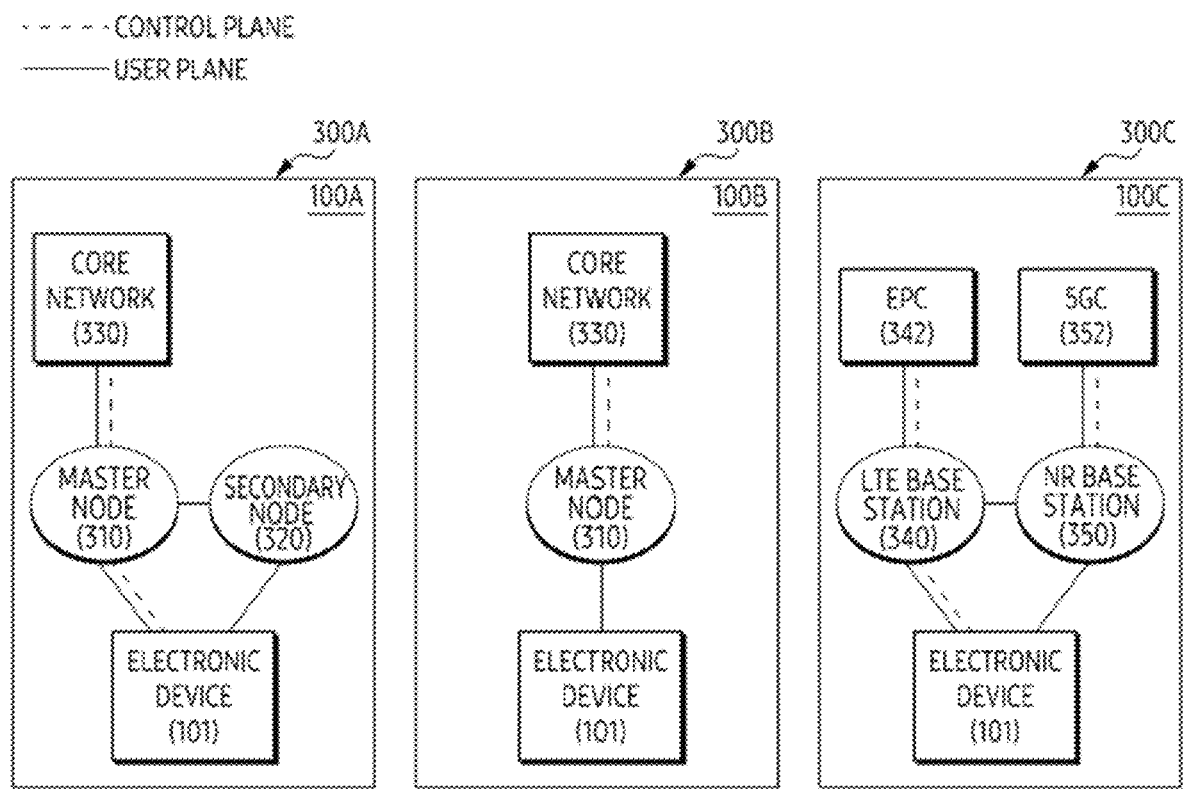
FIG. 3 illustrates wireless communication systems providing a network of legacy communication and/or 5G communication according to various embodiments.

FIG. 3 illustrates wireless communication systems that provide a network of legacy communication and/or 5g communication according to various embodiments.

Referring to FIG. 3, network environments 100*a*, 100*b*, and 100*c* may include at least one of a legacy network and a 5g network. The legacy network may include, for example, a 4G or LTE base station 340 (e.g., eNodeB (eNB)) of a 3GPP standard supporting wireless access with the electronic device 101 and an evolved packet core (EPC) 342 managing 4G communication. The 5G network may include, for example, a New Radio (NR) base station 350 (e.g., gNodeB (gNB)) supporting wireless access with the electronic device 101 and a 5th generation core (5GC) 352 managing 5G communication of the electronic device 101.

According to various embodiments, the electronic device 101 may transmit and receive a control message and user data through legacy communication and/or 5G communication. The control message may include, for example, a message related to at least one of security control, bearer setup, authentication, registration, or mobility management of the electronic device 101. The user data may refer to, for example, user data excluding a control message transmitted and received between the electronic device 101 and the core network 330 (e.g., EPC 342).

Referring to reference number 300A, the electronic device 101 according to an embodiment may transmit and receive at least one of a control message or user data to and from at least a portion (e.g., NR base station 350 and 5GC 352) of the 5G network, using at least a portion (e.g., LTE base station 340 and EPC 342) of the legacy network.

According to various embodiments, the network environment 100A may provide wireless communication dual connectivity MR-DC (multi-RAT(radio access technology) dual connectivity) to the LTE base station 340 and the NR base station 350, and may include a network environment for transmitting and receiving a control message to and from the electronic device 101 through the core network 330 of one of EPC 342 or 5GC 352.

According to various embodiments, in the MR-DC environment, one base station among LTE base station 340 or NR base station 350 may operate as a master node (MN) 310 and the other may operate as a secondary node (SN) 320. The MN 310 may be connected to the core network 330 to transmit and receive a control message. The MN 310 and the SN 320 may be connected through a network interface to transmit and receive messages related to radio resource (e.g., communication channel) management with each other.

According to various embodiments, the MN 310 may be configured to an LTE base station 350, the SN 320 may be configured to an NR base station 350, and the core network (330) may be configured to an EPC 342. For example, a control message may be transmitted and received through the LTE base station 340 and the EPC 342, and user data may be transmitted and received through the LTE base station 350 and the NR base station 350.

Referring to reference number 300B, according to various embodiments, the 5G network may independently transmit and receive a control message and user data to and from the electronic device 101.

Referring to reference number 300C, the legacy network and the 5G network according to various embodiments may independently provide data transmission and reception. For example, the electronic device 101 and the EPC 342 may transmit and receive a control message and user data through the LTE base station 340. As another example, the electronic device 101 and the 5GC 352 may transmit and receive a control message and user data through the NR base station 350.

According to various embodiments, the electronic device 101 may be registered in at least one of the EPC 342 or the 5GC 352 to transmit and receive a control message.

According to various embodiments, the EPC 342 or the 5GC 352 may manage communication of the electronic device 101 by interworking with each other. For example, movement information of the electronic device 101 may be transmitted and received through an interface between the EPC 342 and the 5GC 352.

Figure 4:
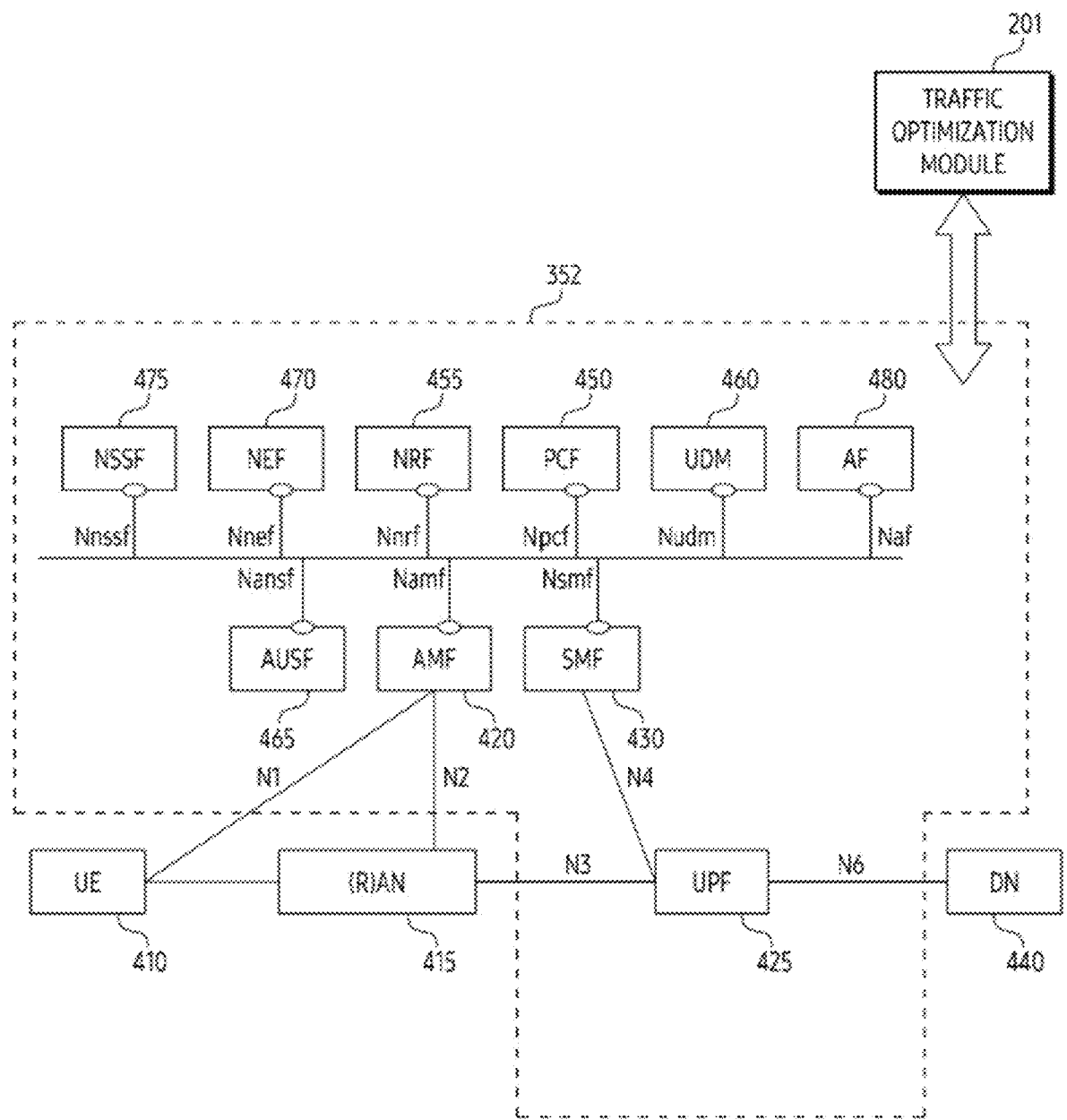
FIG. 4 illustrates a core network structure and a traffic optimization module of 5G communication according to embodiments.

FIG. 4 illustrates a core network 352 and a traffic optimization module 201 of 5G communication according to embodiments.

Referring to FIG. 4, an architecture of the core network (5GC 352 of FIG. 3) may include various network functions. For example, the core network 352 may include at least an access and mobility management function (AMF) 420, a user plane function (UPF) 425, a session management function (SMF) 430, a policy control function (PCF) 450, a NF repository function (NRF) 455, a unified data management (UDM) 460, an authentication server function (AUSF) 465, a network exposure function (NEF) 470, a network slicing selection function (NSSF) 475, and an application function (AF) 480. According to an embodiment, a control plane function (CPF) may include AMF 420, SMF 430, PCF 450, UDM 460, AUSF 465, NEF 470, and AF 480.

The AMF 420 may provide a function for access and mobility management in units of user equipment (UE) 410. For example, the AMF 420 may support signaling for mobility between 3GPP access networks.

The UPF 425 may transmit a downlink packet data unit received from DN 440 to UE 410 via (R)AN 415, and may transmit a uplink packet data unit received from the UE 410 via the (R)AN 415 to the DN 440. Specifically, the UPF 425 may perform an anchor point for intra RAT mobility and/or inter RAT mobility, an external packet data unit (PDU) session point of an interconnect to the DN 440, packet routing, forwarding, and packet inspection.

The SMF 430 provides a session management function, and when the UE 410 has a plurality of sessions, the SMF 430 may be managed by a different SMF for each session. Specifically, the SMF 430 may set session management, IP address allocation and management of the UE 410, and traffic steering for routing traffic from the UPF 425 to an appropriate destination.

The PCF 450 provides a function of determining policies such as network slice policy, QoS policy, and session management. For example, the PCF 450 may support a single policy framework for controlling network operations.

The NRF 455 may support a service discovery function. For example, a network function (NF) discovery request is received from a NF instance. For example, information on the NF discovery requested NF instance is provided to the NF instance.

The UDM 460 may store information on user subscription data and policy data. The UDM 460 may include an application front end and a user data repository (UDR). The AUSF 465 may store data for authentication of the UE 410.

The NEF 470 may provide a means for safely exposing services and abilities for, for example, a 3rd party, internal exposure, application functions, and edge computing, provided by 3GPP network functions. The NSSF 475 may determine a network slice instance (NSI) of network slicing.

The AF 480 may interact with a 3GPP core network to support a service providing (e.g., a function of application influence in traffic routing, Network Capability Exposure access, interaction with policy frameworks for policy control, and so on).

The traffic optimization module 201 according to an embodiment may control to efficiently use a cache memory storing data for traffic processing. For example, the traffic optimization module 201 may receive traffic situation information from the UPF 425 among the core network 352. The traffic situation information may include information on a share of traffic currently transmitting a packet. The traffic optimization module 201 may determine whether to restructure profile information based on the UPF 425 processing traffic based on the traffic situation information.

The profile information may refer to cache lines composing software of the UPF 425 for each traffic situation. The cache line may correspond to a data set of a minimum unit cached on the cache memory. In other words, when one cache line is cached, a plurality of data included in one cache line may be simultaneously loaded on the cache memory. According to an embodiment, the profile information may include traffic information. The traffic information may indicate a traffic type that the UPF 425 may exhibit optimal packet processing performance when the software is configured according to the cache line included in the profile. For example, the traffic information may indicate that TCP packet type for Internet Protocol version 4 (IPv4) is 20%, User Datagram Protocol (UDP) packet type for IPv4 is 30%, Transmission Control Protocol (TCP) packet type for Internet Protocol version 6 (IPv6) is 40%, and UDP packet type for IPv6 is 10%. According to an embodiment, the profile information may include cache line characteristic information. The cache line characteristic information may include information on a data type (e.g., a char data type, an int data type, a float data type), and a size of data included in the cache line. For example, the cache line included in the profile may include first data of the char data type and second data of the int data type. The cache line characteristic information may indicate that the data type of the first data is 1 Byte of the char data type, and the second data is 4 Byte of the int data type. The profile information may further include information on data composing the cache line, information on the number of cache lines required to compose the software of the UPF 425, and information on an access point for data composing the cache line.

The traffic optimization module 201 may determine to restructure profile information based on the UPF 425 in response to identifying that the share of traffic being processed at the UPF 425 exceeds a threshold. The traffic optimization module 201 may optimize information on the cache line included in the profile information. The UPF 425 may execute software based on profile information restructured by the traffic optimization module 201. The UPF 425 may reduce the number of times of caching on the cache memory to improve traffic processing performance, by loading data required for processing traffic indicated by a newly restructured cache line based on the software.

Figure 5:
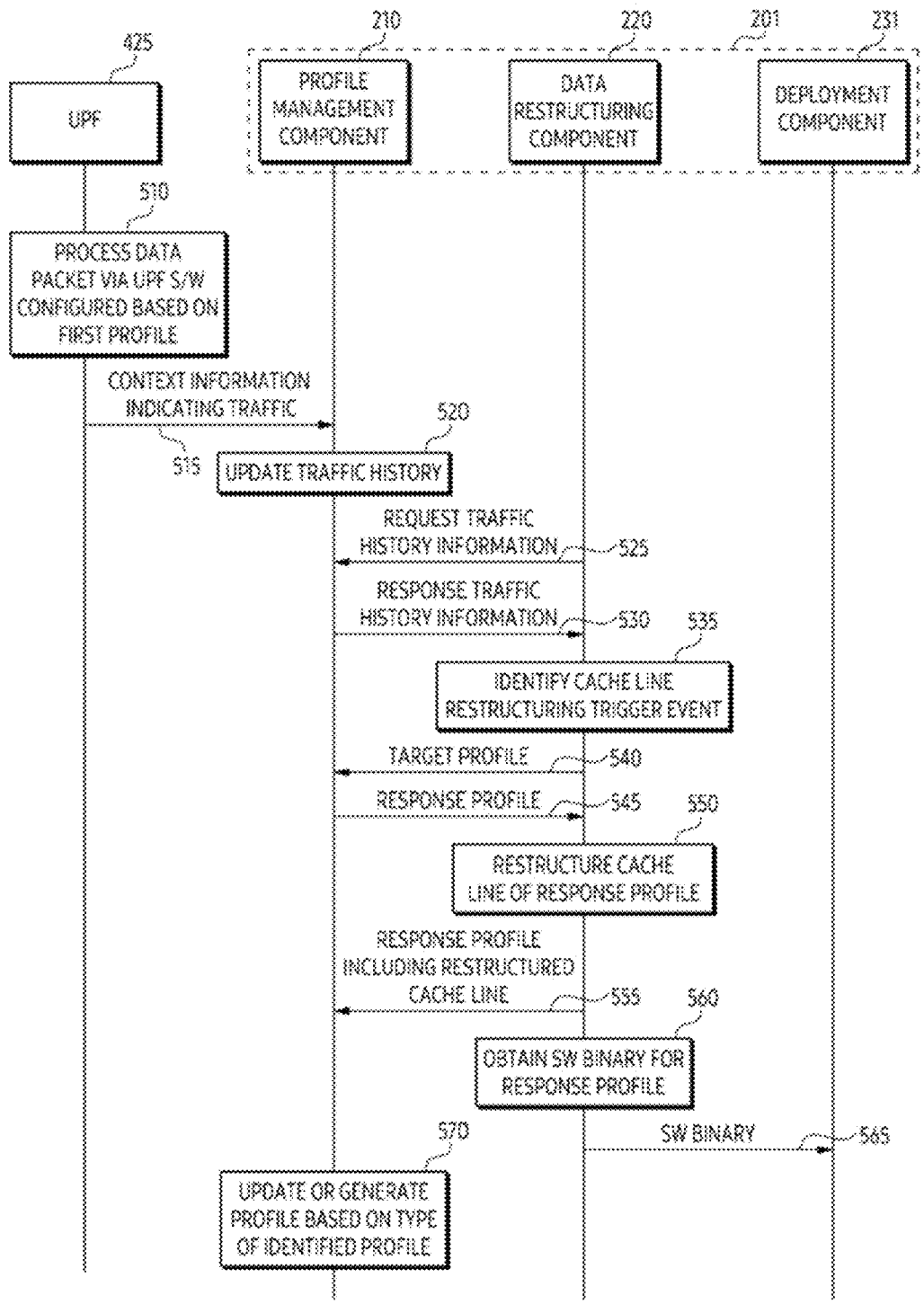
FIG. 5 illustrates a signal exchange diagram between a traffic optimization module and a user plane function (UPF) according to embodiments.

FIG. 5 illustrates a signal exchange diagram between a traffic optimization module and a user plane function (UPF) according to embodiments.

Referring to FIG. 5, in operation 510, the UPF 425 may process a data packet. The UPF 425 may perform traffic monitoring while processing the data packet. For example, the UPF 425 may monitor share classified by communication protocol, communication link, and Internet version protocol in real time among all traffic. The UPF 425 may generate situation information including monitoring information on traffic share.

In operation 515, the UPF 425 may provide the situation information to the traffic optimization module 201. For example, the situation information may be provided to a profile management component 210 of the traffic optimization module 201. For example, the situation information may be provided to the profile management component 210 among the traffic optimization module 201. The profile management component 210 may include a plurality of profile information mapped to each of a plurality of traffic situations and may further include traffic history information storing a traffic monitoring result of the UPF 425. According to an embodiment, the UPF 425 may provide the situation information indicating traffic at predetermined time intervals to the profile management component 210 of the traffic optimization module 201. The predetermined time interval may be changed by a network provider or user setting. According to an embodiment, the UPF 425 may provide the situation information in response to identifying a predetermined condition. For example, when identifying that the traffic share exceeds a preset threshold value, the UPF 425 may provide the context information to the traffic optimization module 201.

In operation 520, the traffic optimization module 201 may update the traffic history information. The profile management component 210 may receive the context information including a monitoring result of the share of traffic being processed at the UPF 425 at predetermined time intervals. The profile management component 210 may update the traffic history information based on the context information received at the predetermined time interval.

In operation 525, a data restructuring component 220 may request the traffic history information from the profile management component 210. The data restructuring component 220 may request the traffic history information from the profile management component 210 at predetermined time intervals. The request for the traffic history information is to determine whether the data restructuring component 220 should periodically monitor the traffic situation to generate an optimal profile for a specific traffic situation.

In operation 530, the profile management component 210 may provide the traffic history information to the data restructuring component 220 in response to the request. The data restructuring component 220 may determine whether an optimal profile should be generated using the traffic history information received from the profile management component 210.

In the above-described embodiment, the data restructuring component 220 is illustrated based on receiving the traffic history information by requesting to the profile management component 210, but is not limited thereto. According to an embodiment, the profile management component 210 may provide the traffic history information to the data restructuring component 220 without receiving a request from the data restructuring component 220. For example, whenever the profile management component 210 receives the context information from the UPF 425 and updates the traffic history information, the profile management component 210 may operate to provide the updated traffic history information to the data restructuring component 220 in response to the update.

In operation 535, the data restructuring component 220 may identify a cache line restructuring trigger event. The cache line restructuring trigger event may correspond to an event for determining whether it is necessary to optimize information on the cache line of a profile based on the UPF 425 that processes current traffic. For example, the data restructuring component 220 may count the number of times the traffic share exceeds a threshold value with reference to the received traffic history information. When the counted number of times exceeds a threshold number, the data restructuring component 220 may identify that the cache line restructuring trigger event has occurred. This is because, when the traffic share exceeding the threshold value frequently occurs, the UPF 425 for processing traffic may estimate that the cache line included in the profile being used is not optimized.

In operation 540, the data restructuring component 220 may request a target profile. The target profile may correspond to a profile identified by the data restructuring component 220 that the cache line restructuring trigger event has occurred in operation 535. The target profile may correspond to a profile that the data restructuring component 220 identifies in operation 535 that the cache line restructuring trigger event has occurred.

In operation 545, the profile management component 210 may provide a response profile to the data restructuring component 220 in response to receiving the target profile. The response profile may correspond to one of the plurality of profiles stored in the profile management component 210.

In operation 550, the data restructuring component 220 may restructure the cache line of the response profile. According to an embodiment, the data restructuring component 220 may obtain accessing timing information included in the response profile. The accessing timing information may store information on timing at which the cache line included in the response profile is loaded into the cache memory. The data restructuring component 220 may identify accessing timing for the same cache line based on the accessing timing information. For example, a first cache line among cache lines stored in the response profile may be loaded into the cache memory for two times. The UPF 425 may load the first cache line and the second cache line into the cache memory to use the first data included in the first cache line and the third data included in the second cache line at a first timing. The UPF 425 may cache the first cache line and the second cache line to use second data included in the first cache line and fourth data included in the second cache line at a second timing later than the first timing. The data restructuring component 220 may restructure the cache line so that the first data of the first cache line and the third data of the second cache line cached at the same first time point are included in the same cache line. In addition, the data restructuring component 220 may restructure the cache line so that the second data of the first cache line cached at the same second time point and the fourth data of the second cache line are included in the same cache line. When the UPF 425 is based on the profile including the restructured cache line, the UPF 425 may process packet transmission by loading only one cache line reconstructed to include the first data and the third data at the first time point. When the UPF 425 is based on the profile including the restructured cache line, the UPF 425 may process packet transmission by loading only one cache line restructured to include the second data and the fourth data at the second time point. In other words, the number of cache lines loaded by the UPF 425 at the first time point and the second time point may be reduced from two to one. According to an embodiment, the data restructuring component 220 may be based on an approximate search algorithm (e.g., simulated annealing, genetic algorithm) and/or artificial intelligence algorithm (e.g., deep learning, machine learning) to restructure a profile including new cache lines.

In operation 555, the data restructuring component 220 may provide the restructured profile to the profile management component 210. The profile management component 210 may receive a profile composed of an optimal cache line by receiving the restructured profile.

In operation 560, the data restructuring component 220 may obtain a software binary for a response profile including the restructured cache line. The software binary may be used by the traffic optimization module 201 to update software operated by the entity that received the binary by providing it to the entities included in the core network 352.

In operation 565, the data restructuring component 220 may provide the obtained software binary to a deployment component 231.

In operation 570, the profile management component 210 may perform profile update or may generate a new profile according to the type of the response profile. According to an embodiment, the profile management component 210 may perform profile update. For example, in operation 545, the profile management component 210 may identify a profile matching the target profile among the plurality of profiles, and may provide the identified profile to the data restructuring component 220. The profile management component 210 may receive a restructured profile from the data restructuring component 220, and may replace the restructured profile with a profile identified as matching the target profile. According to an embodiment, the profile management component 210 may generate a new profile. For example, in operation 545, the profile management component 210 may not identify a profile matching the target profile among the plurality of profiles, and thus may provide a profile similar to the target profile to the data restructuring component 220. The profile management component 210 may store the restructured profile received from the data restructuring component 220 as a new profile. Traffic matching the new profile may be labeled the same as traffic of the target profile (for example, 20% of TCP packet types of IPv4, 30% of UDP packet types of IPv4, 40% of TCP packet types of IPv6, and 10% of UDP packet types of IPv6).

Figure 6:
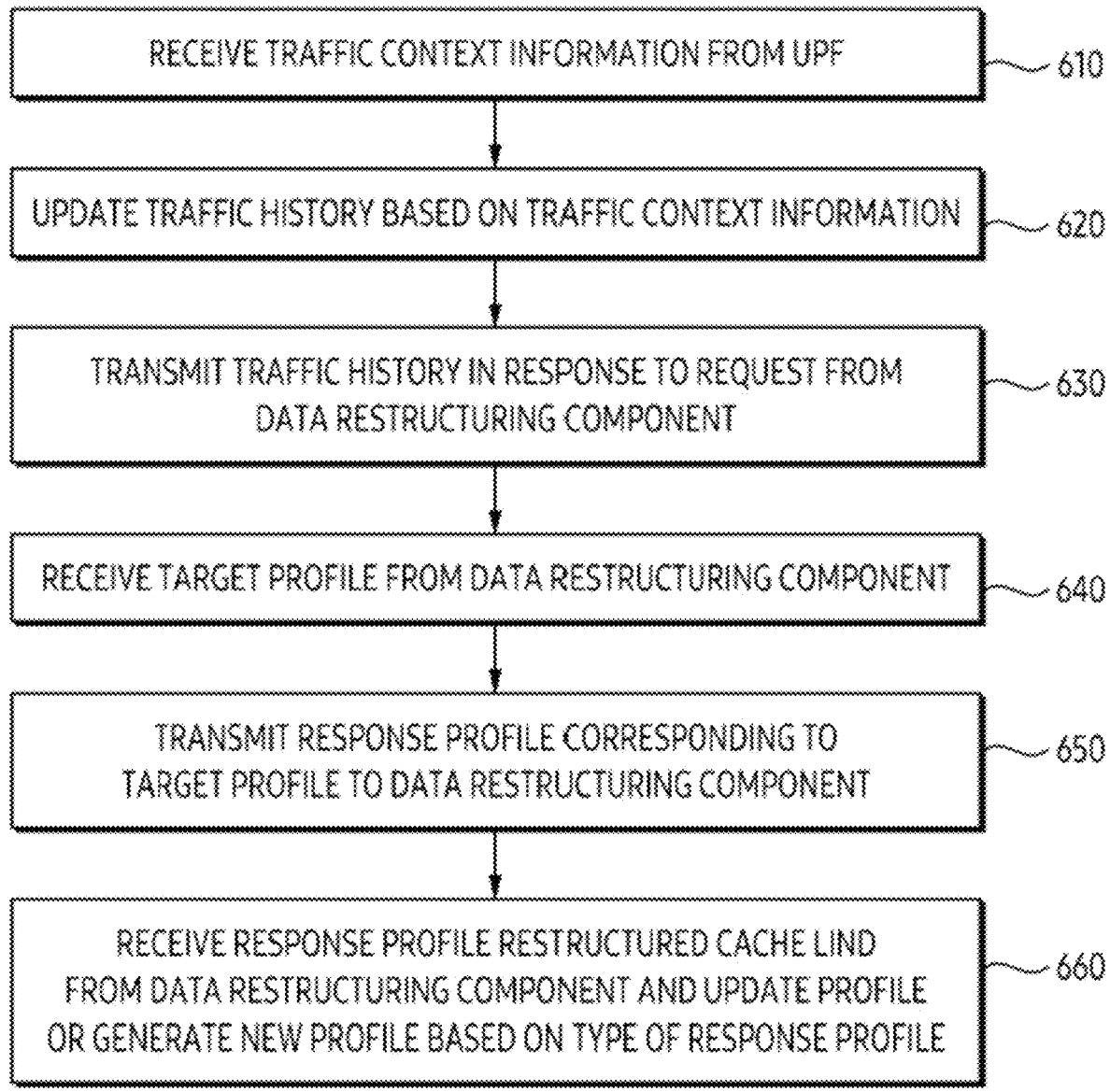
FIG. 6 is a flowchart illustrating an operation of a profile management component of a traffic optimization module according to embodiments.

FIG. 6 is a flowchart illustrating an operation of the profile management component 210 of the traffic optimization module 201 according to embodiments.

Referring to FIGS. 4 and 6 together, in operation 610, the profile management component 210 may receive traffic context information from the UPF 425. The traffic context information may include information on the share of traffic measured by the UPF 425 processing the packet.

In operation 620, the profile management component 210 may update the traffic history based on the traffic context information. For example, the profile management component 210 may update the traffic history information based on the context information received from the UPF 425 at the every predetermined time interval. In operation 630, the profile management component 210 may transmit the traffic history in response to a request of the data restructuring component 220.

In operation 640, the profile management component 210 may receive a target profile from the data restructuring component 220. The target profile may include traffic information determined by the data restructuring component 220 to be restructured into an optimal cache line. For example, the profile management component 210 may receive a profile in which a TCP packet type of IPv4 is 10%, a UDP packet type of IPv4 is 10%, a TCP packet type of IPv6 is 40%, and a UDP packet type of IPv6 is 40% as a target profile.

In operation 650, the profile management component 210 may transmit an identified profile corresponding to the target profile to the data restructuring component 220. The profile management component 210 may search for whether a profile matching traffic information of the target profile exists among a plurality of previously stored profiles. When a profile of traffic information matching traffic information of the target profile is identified, the identified profile may be transmitted to the data restructuring component 220. When a profile of traffic information matching traffic information of the target profile is not identified, a profile of traffic information closest to the traffic information of the target profile may be transmitted to the data restructuring component 220.

In operation 660, the profile management component 210 may receive a response profile with a cache line restructured from the data restructuring component 220, and may update the profile according to the type of the response profile, or may generate a new profile. For example, the profile management component 210 may identify the response profile among a plurality of profiles previously stored in operation 650. The profile management component 210 may update to a profile corresponding to traffic information of the target profile based on the restructured cache line included in the response profile received from the data restructuring component 220. For another example, the profile management component 210 may not identify a profile matching traffic information of the target profile in operation 650. In this case, traffic information corresponding to the response profile received from the data restructuring component 220 may indicate a new traffic situation that is not covered by a plurality of profiles. Accordingly, the profile management component 210 may add a response profile received from the data restructuring component 220 as a profile for a new traffic situation.

Figure 7:
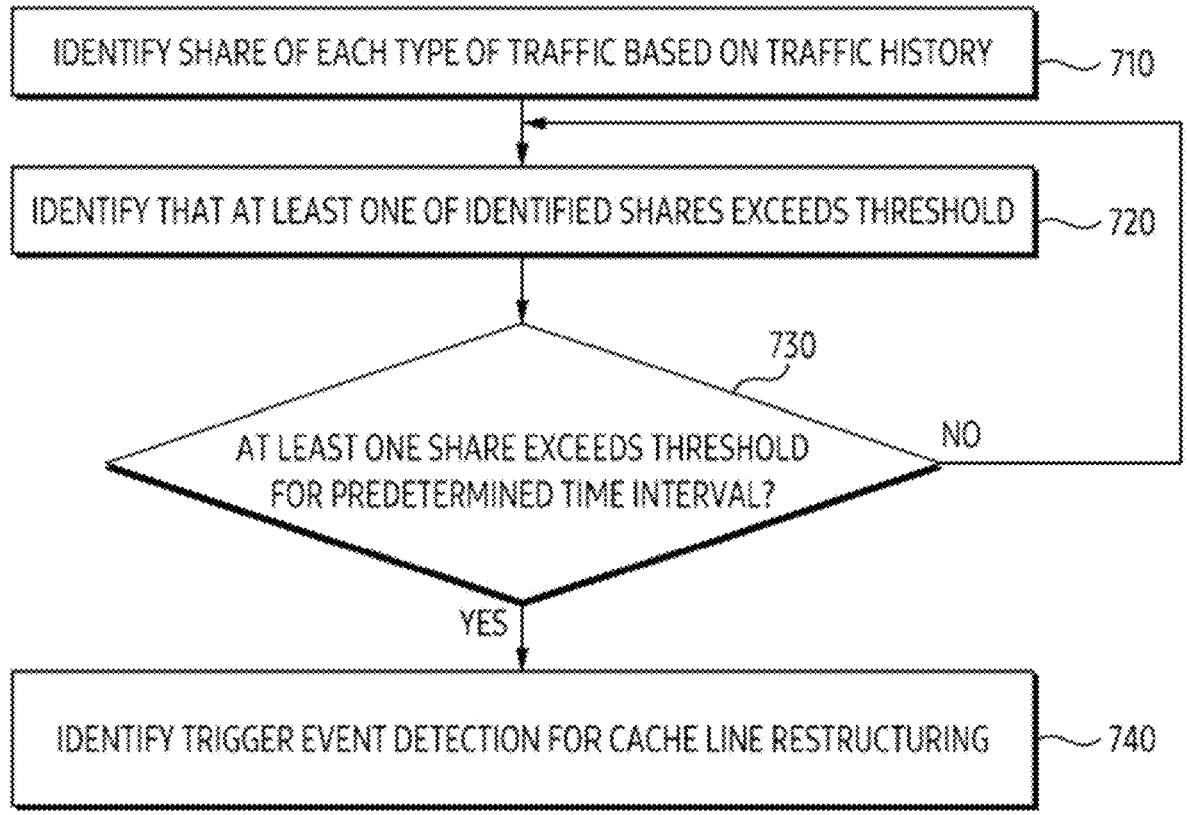
FIG. 7 is a flowchart illustrating an operation of detecting a cache line restructuring trigger event by a data restructuring component of a traffic optimization module according to embodiments.

FIG. 7 is a flowchart illustrating an operation of detecting a cache line restructuring trigger event by the data restructuring component 220 of the traffic optimization module 201 according to embodiments.

Referring to FIG. 7, in operation 710, the data restructuring component 220 may identify shares of each of the traffic types based on the traffic history information. For example, based on the traffic history information, the data restructuring component 220 may identify that the TCP packet type of IPv4 corresponds to 20%, the UDP packet type of IPv4 corresponds to 30%, the TCP packet type of IPv6 corresponds to 40%, and the UDP packet type of IPv6 corresponds to 10%.

In operation 720, the data restructuring component 220 may identify that at least one share of the identified shares exceeds a threshold value. For example, the data restructuring component 220 may identify that the share of UDP packets of IPv4 exceeds 70% among traffic.

In operation 730, the data restructuring component 220 may detect a trigger event for cache line restructuring in operation 740 by identifying whether at least one share exceeds a threshold value during a predetermined time interval. For example, the data restructuring component 220 may identify that the share of UDP packets of IPv4 exceeds 70%, and continuously exceeds 70%, during the predetermined time interval. The data restructuring component 220 may predict that packet processing performance will decrease because currently the software of UPF 425 is optimized in traffic situations where the TCP packet type of IPv4 is 20%, the UDP packet type of IPv4 is 30%, the TCP packet type of IPv6 is 40%, and the UDP packet type of IPv6 is 10%. The data restructuring component 220 may restructure a cache line to optimize packet processing performance of the UPF 425 in a traffic situation in which the share of UDP packets of IPv4 exceeds 70%.

Figure 8:
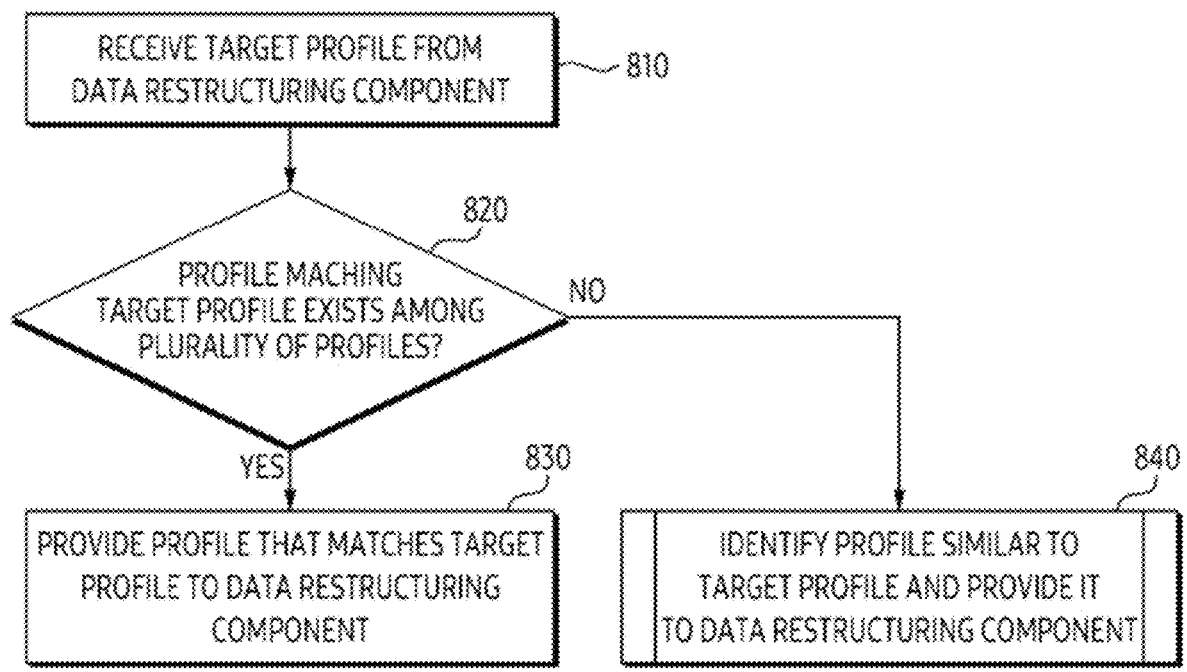
FIG. 8 is a flowchart illustrating an operation of identifying a response profile by a profile management component of a traffic optimization module according to embodiments.

FIG. 8 is a flowchart illustrating an operation of identifying a response profile by the profile management component 210 of a traffic optimization module 201 according to embodiments.

Referring to FIG. 8, in operation 810, the profile management component 210 may receive a target profile from the data restructuring component 220. The target profile may be a profile corresponding to a traffic situation identified to restructure the cache line. For example, the profile management component 210 may receive a profile in which a TCP packet type of IPv4 is 10%, a UDP packet type of IPv4 is 10%, a TCP packet type of IPv6 is 40%, and a UDP packet type of IPv6 is 40% as a target profile.

In operation 820, the profile management component 210 may identify whether a profile matching the target profile exists among a plurality of profiles. The profile management component 210 may search for a profile of traffic information matching traffic information of the target profile among a plurality of previously stored profiles. For example, the profile management component 210 may search whether a profile in which a TCP packet type of IPv4 is 10%, a UDP packet type of IPv4 is 10%, a TCP packet type of IPv6 is 40%, and a UDP packet type of IPv6 is 40% exists among the plurality of profiles.

In operation 830, the profile management component 210 may provide a profile matching the target profile to the data restructuring component 220. The provided profile may be a response profile. Traffic information of the response profile may be the same as traffic information of the target profile. For example, the profile management component 210 may previously store a profile in which a TCP packet type of IPv4 is 10%, a UDP packet type of IPv4 is 10%, a TCP packet type of IPv6 is 40%, and a UDP packet type of IPv6 is 40%, as one of the plurality of profiles. The profile management component 210 may provide the data restructuring component 220 with a profile that matches the target profile and traffic information.

In operation 840, the profile management component 210 may identify a profile similar to the target profile and may provide it to the data restructuring component 220. In this case, the traffic information of the response profile provided to the data restructuring component 220 may be different from the traffic information of the target profile. For example, among a plurality of profiles stored by the profile management component 210, a profile that exactly matches the traffic information of the target profile may not exist. The profile management component 210 may identify a profile including traffic information similar to traffic information of the target profile. For example, the identified profile may be a profile including traffic information configure with that a TCP packet type of IPv4 is 5%, a UDP packet type of IPv4 is 15%, a TCP packet type of IPv6 is 40%, and a UDP packet type of IPv6 is 40%. The traffic information may be different by 5% from each of the TCP packet type of IPv4 and the UDP packet type of IPv4 among the traffic information of the target profile. The profile management component 210 may provide the identified profile as a response profile to the data restructuring component 220.

Figure 9:
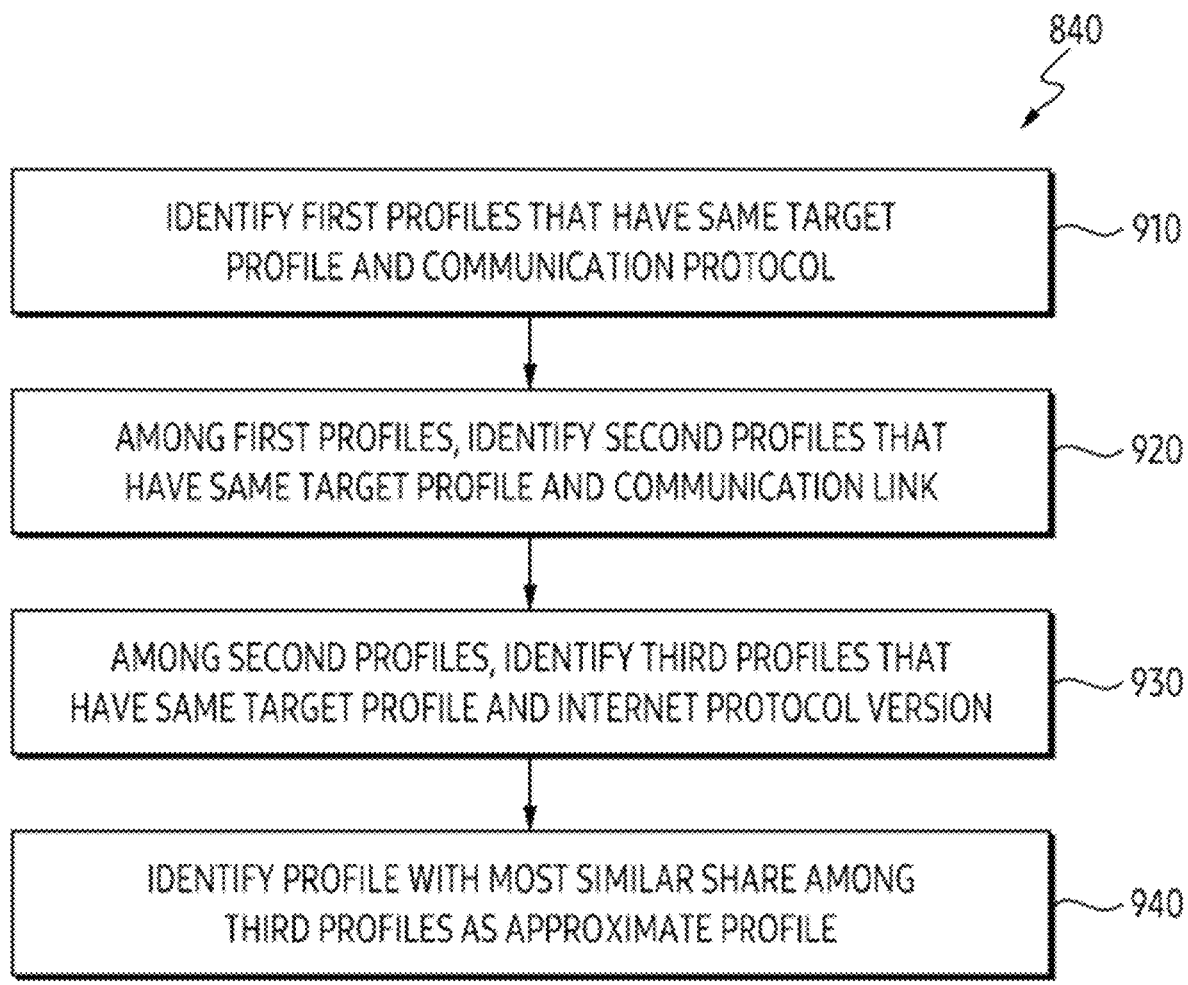
FIG. 9 is a flowchart illustrating an operation in which a profile management component of a traffic optimization module identifies a response profile similar to a target profile according to embodiments.

FIG. 9 is a flowchart illustrating an operation of identifying a response profile similar to a target profile by a profile management component 210 of the traffic optimization module 201 according to embodiments.

Referring to FIG. 9, in operation 910, the profile management component 210 may identify first profiles having the same communication protocol as the target profile. For example, the target profile may include traffic information that processes 100% of UDP packets of IPv6 via a downlink. In this case, the profile management component 210 may identify the remaining profiles among a plurality of profiles except for profiles that do not process UDP packets (for example, processing only TCP packets of IPv4) as the first profiles.

In operation 920, the profile management component 210 may identify second profiles of which the target profile and the communication link are the same among the first profiles. For example, the target profile may include traffic information that processes 100% of UDP packets of IPv6 via a downlink. In this case, the profile management component 210 may identify the remaining profiles except for the profiles that process the UDP packet via uplink among the first profiles as the second profiles.

In operation 930, the profile management component 210 may identify third profiles of which the target profile and the Internet protocol version are the same among the second profiles. For example, the target profile may include traffic information that processes 100% of UDP packets of IPv6 via downlink. In this case, the profile management component 210 may identify the remaining profiles except for the profiles that process packets based on the Internet version protocol of IPv4 among the second profiles as the third profiles.

In operation 940, the profile management component 210 may identify one profile having the most similar share among the third profiles. For example, all of the third profiles may include all profiles that process at least a part of UDP packets of IPv6 via downlink. The profile management component 210 may determine one profile in which the share of UDP packets of IPv6 is closest to 100 and identify it as a response profile.

Figure 10:
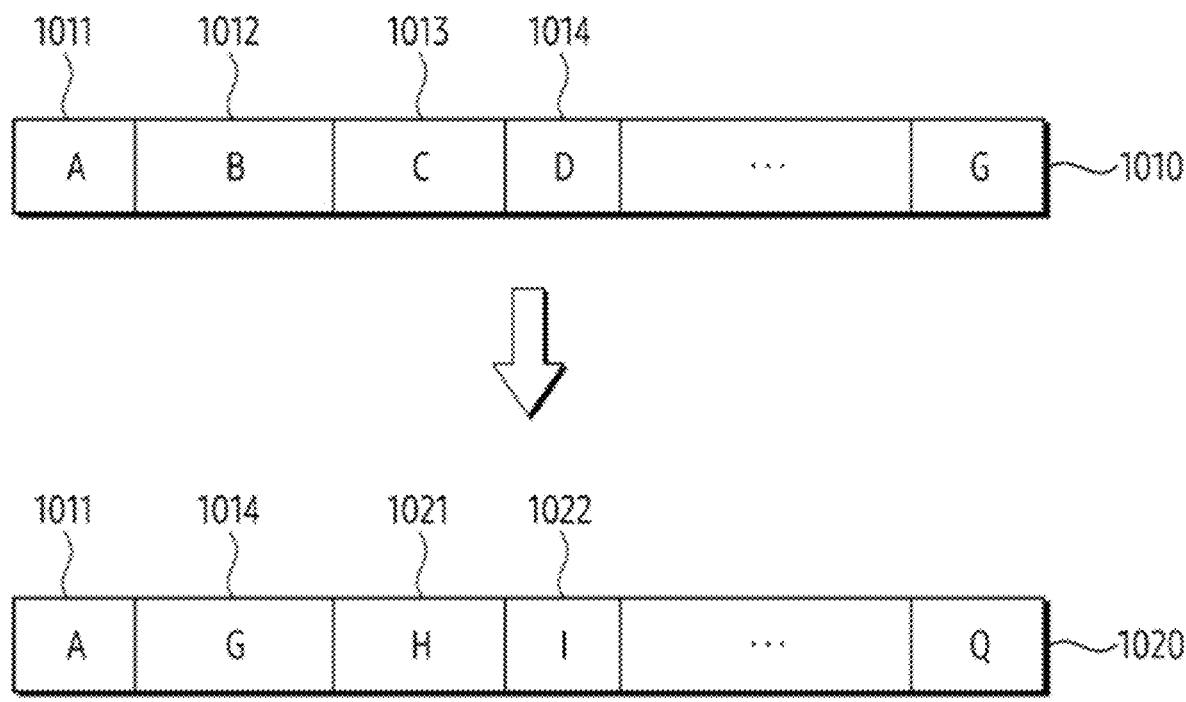
FIG. 10 illustrates an example of a cache line restructured based on a data restructuring module according to embodiments.

FIG. 10 illustrates an example of a cache line restructured based on the data restructuring component 220 according to embodiments.

Referring to FIG. 10, the cache line 1010 may be a cache line before being restructured by the data restructuring component 220. The cache line 1020 may be a cache line after being restructured by the data restructuring component 220. The cache line 1010 may include at least data A 1011, data B 1012, data C 1013, and data D 1014. The cache line 1020 may include at least data A 1011, data D 1014, data H 1021, and data I 1022.

According to an embodiment, the UPF 425 may refer to the data A 1011, the data C 1013 and the data D 1014 at a first time point for processing the data packet, and may refer to the data B 1012 at a second time point delayed than the first time point. When a time difference between the first time point and the second time point is greater than a threshold time, the data restructuring component 220 may move the data B 1012 from the cache line 1010 to another cache line for cache line optimization. When the data restructuring component 220 does not move the data B 1012, since the cache line 1010 is cached twice at the first time point and the second time point in the process of processing the data packet, packet processing performance may be degraded.

According to an embodiment, the data C 1013 may be for a specific function used in a process of processing a data packet. For example, when the specific function is deactivated after the cache line 1010 is generated, the data C 1013 may no longer be referenced in the packet processing process. However, since the cache memory is cached in units of cache lines, data C 1013 that will not be referenced may cause frequent caching of the cache memory, thereby degrading packet processing performance. Accordingly, the data restructuring component 220 may delete the data C 1013 from the cache line 1010 during the cache line restructuring process.

According to an embodiment, the data restructuring component 220 may delete the data B 1012 and the data C 1013 from the cache line 1010, and may include the data H 1021 and the data I 1022. For example, the data H 1021 and the data I 1022 may be data included in a cache line other than the cache line 1010. The data restructuring component 220 may identify that the access time point corresponds to first time point by referring to access time point information of the data H 1021 and the data I 1022. The data restructuring component 220 may restructure the cache line 1010 to minimize the number of cache lines. The data restructuring component 220 may restructure the cache line 1020 by including the data H 1021 and the data I 1022 as a cache line 1010 including the data A 1011 and the data D 1014 accessed at a first time point. When the UPF 452 executes the software based on the profile including the restructured cache line 1020, the same cache line may be prevented from being repeatedly cached, and accordingly, packet processing performance may be improved.

According to one or more embodiments, a traffic optimization module can maintain high-speed packet processing performance in various traffic situations by managing a profile including a cache line that can utilize cache memory as efficiently as possible according to a traffic situation.

In a wireless communication system according to an embodiment as described above, a traffic optimization module managing a profile associated with a traffic processing of user plane function (UPF) may comprise a profile management component storing a plurality of profiles; and a data restructuring component for restructuring a cache line included in a profile, wherein the traffic optimization module may be configured to receive, from the UPF via the profile management component, context information that is based on a traffic for a data packet being processed; update, via the profile management component, traffic history information stored in the profile management component based on the context information; determine whether to perform data restructuring that is based on the traffic history information or not by referring to the traffic history information stored in the profile management component via the data restructuring component; identify, via the profile management component, a profile that at least matches a target profile requested by the data restructuring component from among the plurality of profiles, if determining to perform the data restructuring; restructure, via the data restructuring component, a data set included in the identified profile as a data set including data required for processing the context information; and provide, via the data restructuring component to the profile management component, the identified profile including the restructured data set.

According to an embodiment, the traffic optimization module may further comprise a deployment component, wherein the data restructuring component may be configured to provide the identified profile including the restructured data set to the deployment component, and wherein the deployment component may be configured to provide the identified profile including the restructured data set to the UPF.

According to an embodiment, each of the plurality of profiles may be identified based on a protocol type indicating one of a transmission control protocol (TCP) or user datagram protocol (UDP), a communication link type indicating one of a uplink or a downlink, and an internet protocol version indicating one of an IPv4 or an IPv6.

According to an embodiment, the profile management component may be configured to identify, based on a priority determined based on an order of the protocol type, the communication link type, and the internet protocol version, a profile similar to the target profile.

According to an embodiment, when it fails to identify a profile that matches all of the protocol type, the communication link type, and the Internet protocol version of the target profile, the restructured data set may be generated based on an algorithm comprising an approximate search method such as a simulated annealing (SA) or a genetic algorithm (GA) or an artificial intelligence algorithm comprising a deep learning (DL) or a machine learning (ML).

According to an embodiment, the data restructuring component may be configured to obtain binary information for the identified profile including the restructured data set, and the deployment component may be configured to provide the obtained binary information to the UPF.

According to an embodiment, the data restructuring component may be configured to request the traffic history information stored in the profile management component at predetermined time intervals; and determine, in response to identifying to exceed a threshold traffic based on the traffic history information, performing of the restructuring of the data set.

According to an embodiment, the profile may include information for an accessing timing of each of data included in the profile and information for a data type and a size of the data.

According to an embodiment, the profile may include information for identifying a number of data sets stored in the profile and data included in the data sets.

According to an embodiment, the target profile may include information indicating the identified threshold traffic.

In a wireless communication system according to an embodiment as described above, a method for operating a traffic optimization module that manages a plurality of profiles associated with a traffic processing of user plane function (UPF) may comprise receiving, from the UPF, context information that is based on a traffic for a data packet being processed; updating traffic history information stored in a profile management component of the traffic optimization module based on the context information; determining whether to perform data restructuring that is based on the traffic history information or not by referring to the traffic history information; identifying a profile that at least matches a target profile from among the plurality of profiles, if determining to perform the data restructuring; and restructuring a data set included in the identified profile as a data set including data required for processing the context information.

According to an embodiment, the method may comprise providing the identified profile including the restructured data set to a deployment component; and providing the identified profile including the restructured data set to the UPF.

According to an embodiment, each of the plurality of profiles may be identified based on a protocol type indicating one of a transmission control protocol (TCP) or user datagram protocol (UDP), a communication link type indicating one of an uplink or a downlink, and an internet protocol version indicating one of an IPv4 or an Ipv6.

According to an embodiment, the method may comprise, when it fails to identify a profile that matches all of the protocol type, the communication link type, and the Internet protocol version of the target profile, identifying, based on a priority determined based on an order of the protocol type, the communication link type, and the internet protocol version, a profile similar to the target profile.

According to an embodiment, the restructured data set may be generated based on an algorithm comprising an approximate search method such as a simulated annealing (SA) or a genetic algorithm (GA) or an artificial intelligence algorithm comprising a deep learning (DL) or a machine learning (ML).

According to an embodiment, the method may comprise obtaining binary information for the identified profile including the restructured data set; and providing the obtained binary information to the UPF.

According to an embodiment, it may further comprise requesting the traffic history information stored in the profile management component at predetermined time intervals; and determining, in response to identifying to exceed a threshold traffic based on the traffic history information, performing of the restructuring of the data set.

According to an embodiment, the profile may include information for an accessing timing of each of data included in the profile and information for a data type and a size of the data.

According to an embodiment, the profile may further include information for identifying a number of data sets included in the profile and data included in each of the data sets.

According to an embodiment, the target profile may include information indicating the identified threshold traffic.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
at least one processor comprising processing circuitry; and
memory comprising one or more storage media storing one or more programs configured to be executed by the at least one processor individually or collectively for managing a traffic based on a profile associated with a traffic processing of a user plane function (UPF) in a wireless communication system, the one or more programs including instructions to cause the electronic device to:
receive, from the UPF, context information associated with a traffic for a data packet processed in the UPF;
update traffic history information based on the context information;
determine a target profile for data restructuring of cache line based on the traffic history information;
identify a profile that at least matches the target profile, from among the plurality of profiles that have been stored with respect to the UPF; and
perform the data restructuring of cache line by restructuring a data set included in the identified profile to include data for processing the context information.

2. The electronic device of claim 1, wherein the one or more programs include instructions to cause the electronic device to
transmit the identified profile including the restructured data set to the UPF.

3. The electronic device of claim 1, wherein each of the plurality of profiles is identified based on a protocol type indicating one of a transmission control protocol (TCP) or a user datagram protocol (UDP), a communication link type indicating one of an uplink or a downlink, and an internet protocol version indicating one of an internet protocol version 4 (IPv4) or an internet protocol version 6 (IPv6).

4. The electronic device of claim 3, wherein the one or more programs include instructions to cause the electronic device to:
based on failing to identify, from among the plurality of profiles, a profile that matches all of the protocol type, the communication link type, and the internet protocol version of the target profile, determine a priority in accordance with an order of the protocol type, the communication link type, and the internet protocol version, and
wherein the profile is identified as one of the plurality of profiles similar to the target profile in accordance with the determined priority.

5. The electronic device of claim 1, wherein the restructured data set is generated based on an algorithm comprising a simulated annealing (SA) and/or a genetic algorithm (GA), or an artificial intelligence algorithm comprising a deep learning (DL) and/or a machine learning (ML).

6. The electronic device of claim 1, wherein the one or more programs include instructions to cause the electronic device to:
obtain binary information for the identified profile including the restructured data set, and
transmit the identified profile to the UPF by transmitting the obtained binary information to the UPF.

7. The electronic device of claim 1, wherein the one or more programs include instructions to cause the electronic device to:
periodically identify the traffic history information in accordance with a defined cycle; and
determine, in response to identifying to exceed a threshold traffic based on the identifying of the traffic history information periodically performed, performing the data restructuring of cache line.

8. The electronic device of claim 1, wherein the identified profile includes information for an accessing timing of data included in the identified profile and information for a data type and a size of the data included in the identified profile.

9. The electronic device of claim 1, wherein the identified profile further includes information for identifying a number of data sets stored in the identified profile.

10. The electronic device of claim 1, wherein the target profile includes information indicating a threshold traffic used for determining whether to perform the data restructuring of cache line.

11. A method for operating a traffic optimization module that manages a traffic processing of a user plane function (UPF) in a wireless communication system, the method comprising:
receiving, from the UPF, context information associated with a traffic for a data packet processed in the UPF;
updating traffic history information stored in the traffic optimization module, based on the context information;
determining whether to perform data restructuring of cache line based on the traffic history information;
based on determining to perform the data restructuring of cache line, identifying a profile that at least matches a target profile from among a plurality of profiles that have been stored with respect to the UPF; and
perform the data restructuring of cache line by restructuring a data set included in the identified profile as a data set including data for processing the context information.

12. The method of claim 11, further comprising transmitting the identified profile including the restructured data set to
the UPF.

13. The method of claim 11, wherein each of the plurality of profiles is identified based on a protocol type indicating one of a transmission control protocol (TCP) or a user datagram protocol (UDP), a communication link type indicating one of an uplink or a downlink, and an internet protocol version indicating one of an internet protocol version 4 (IPv4) or an internet protocol version 4 (IPv6).

14. The method of claim 13, further comprising:
based on failing to identify, from among the plurality of profiles, a profile that matches all of the protocol type, the communication link type, and the internet protocol version of the target profile, determining a priority in accordance with an order of the protocol type, the communication link type, and the internet protocol version,
wherein the profile is identified as one of the plurality of profiles similar to the target profile in accordance with the determined priority.

15. The method of claim 11, wherein the restructured data set is generated based on an algorithm comprising a simulated annealing (SA) and/or a genetic algorithm (GA), or an artificial intelligence algorithm comprising a deep learning (DL) and/or a machine learning (ML).

16. The method of claim 11, further comprising:
obtaining binary information for the identified profile including the restructured data set; and
transmitting the identified profile to the UPF by transmitting the obtained binary information to the UPF.

17. The method of claim 11, further comprising:
periodically identifying the traffic history information in accordance with a defined cycle; and
determining, in response to identifying to exceed a threshold traffic based on the identifying of the traffic history information periodically performed, performing the data restructuring of cache line.

18. The method of claim 11, wherein the identified profile includes information for an accessing timing of each of data included in the identified profile and information for a data type and a size of the data included in the identified profile.

19. The method of claim 11, wherein the identified profile further includes information for identifying a number of data sets stored in the identified profile.

20. The method of claim 11, wherein the target profile includes information indicating a threshold traffic used for determining whether to perform the data restructuring of cache line.

* * * * *